US009291506B2

(12) United States Patent
Cabib et al.

(10) Patent No.: US 9,291,506 B2
(45) Date of Patent: Mar. 22, 2016

(54) ROOM-TEMPERATURE FILTERING FOR PASSIVE INFRARED IMAGING

(75) Inventors: Dario Cabib, Timrat (IL); Moshe Lavi, Nofit (IL)

(73) Assignee: CI SYSTEMS LTD., Migdal Haemek (IL)

(*) Notice: Subject to any disclaimer, the term of this patent is extended or adjusted under 35 U.S.C. 154(b) by 430 days.

(21) Appl. No.: 13/170,188

(22) Filed: Jun. 28, 2011

(65) Prior Publication Data
US 2011/0279681 A1 Nov. 17, 2011

Related U.S. Application Data

(63) Continuation-in-part of application No. 12/853,319, filed on Aug. 10, 2010.

(60) Provisional application No. 61/298,569, filed on Jan. 27, 2010, provisional application No. 61/487,312, filed on May 18, 2011.

(51) Int. Cl.
H04N 5/33 (2006.01)
G01J 5/06 (2006.01)
G01J 5/08 (2006.01)
G01J 5/60 (2006.01)
H04N 5/217 (2011.01)
H04N 5/225 (2006.01)
G01J 5/00 (2006.01)

(52) U.S. Cl.
CPC .. G01J 5/06 (2013.01); G01J 5/061 (2013.01); G01J 5/08 (2013.01); G01J 5/0806 (2013.01); G01J 5/0862 (2013.01); G01J 5/602 (2013.01); H04N 5/217 (2013.01); H04N 5/2254 (2013.01); H04N 5/33 (2013.01); G01J 2005/0077 (2013.01)

(58) Field of Classification Search
CPC combination set(s) only.
See application file for complete search history.

(56) References Cited

U.S. PATENT DOCUMENTS

| 3,770,958 | A | | 11/1973 | Krakow | |
| 5,408,100 | A | | 4/1995 | Gallivan | |
| 5,424,543 | A | * | 6/1995 | Dombrowski et al. | 250/330 |
| 5,434,413 | A | | 7/1995 | Kennedy | |
| 5,602,394 | A | * | 2/1997 | Dombrowski et al. | 250/339.02 |
| 5,821,535 | A | * | 10/1998 | Dombrowski et al. | 250/339.02 |
| 5,949,074 | A | * | 9/1999 | Dombrowski et al. | 250/339.02 |
| 6,008,492 | A | * | 12/1999 | Slater et al. | 250/334 |
| 6,444,984 | B1 | * | 9/2002 | Lundgren et al. | 250/339.03 |
| 7,538,869 | B2 | * | 5/2009 | Treado | G01N 21/64 356/301 |
| 2004/0211894 | A1 | * | 10/2004 | Hother et al. | 250/269.1 |

(Continued)

FOREIGN PATENT DOCUMENTS

| DE | 202004007140 | 7/2004 |
| DE | 102007051893 | 5/2009 |
| FR | 2137523 | 12/1972 |

*Primary Examiner* — Chikaodili E Anyikire
*Assistant Examiner* — Kehinde O Abimbola
(74) *Attorney, Agent, or Firm* — Mark M. Friedman

(57) ABSTRACT

A device, for imaging a scene, includes a detector of the radiation that includes a plurality of detector elements, a circularly variable filter, a mechanism for rotating the filter perpendicular to the optical path of the radiation from the scene to the detector, and a data capture apparatus. All the detector elements are repeatedly interrogated by as a group as the filter rotates, to acquire images of the scene, each of which includes a plurality of image portions in respective spectral bands of the filter. The image portions are assembled to form processed images, each of which depicts the scene in a single respective spectral band.

14 Claims, 9 Drawing Sheets

(56) References Cited

U.S. PATENT DOCUMENTS

| | | | |
|---|---|---|---|
| 2005/0134854 A1* | 6/2005 | Aguirre | G01J 1/20 356/416 |
| 2006/0081777 A1* | 4/2006 | Bevan | G01J 5/0003 250/330 |
| 2006/0164640 A1* | 7/2006 | Treado | G01J 3/2823 356/326 |
| 2007/0092646 A1* | 4/2007 | Shinozaki et al. | 427/248.1 |
| 2007/0092651 A1* | 4/2007 | Shinozaki et al. | 427/294 |
| 2007/0095791 A1* | 5/2007 | Shinozaki et al. | 216/92 |
| 2007/0152153 A1* | 7/2007 | Bevan | G01J 5/0003 250/338.1 |
| 2007/0252978 A1* | 11/2007 | Van Der Voort et al. | 356/301 |
| 2008/0204847 A1* | 8/2008 | Kamm et al. | 359/238 |
| 2009/0097020 A1* | 4/2009 | Treado | G01N 21/64 356/301 |
| 2010/0188555 A1* | 7/2010 | Hirao et al. | 348/340 |
| 2010/0188556 A1* | 7/2010 | Hirao et al. | 348/340 |
| 2011/0169962 A1* | 7/2011 | Gat et al. | 348/164 |
| 2011/0177562 A1* | 7/2011 | Vann et al. | 435/91.2 |
| 2011/0181730 A1* | 7/2011 | Cabib et al. | 348/164 |
| 2011/0279681 A1* | 11/2011 | Cabib et al. | 348/164 |

* cited by examiner

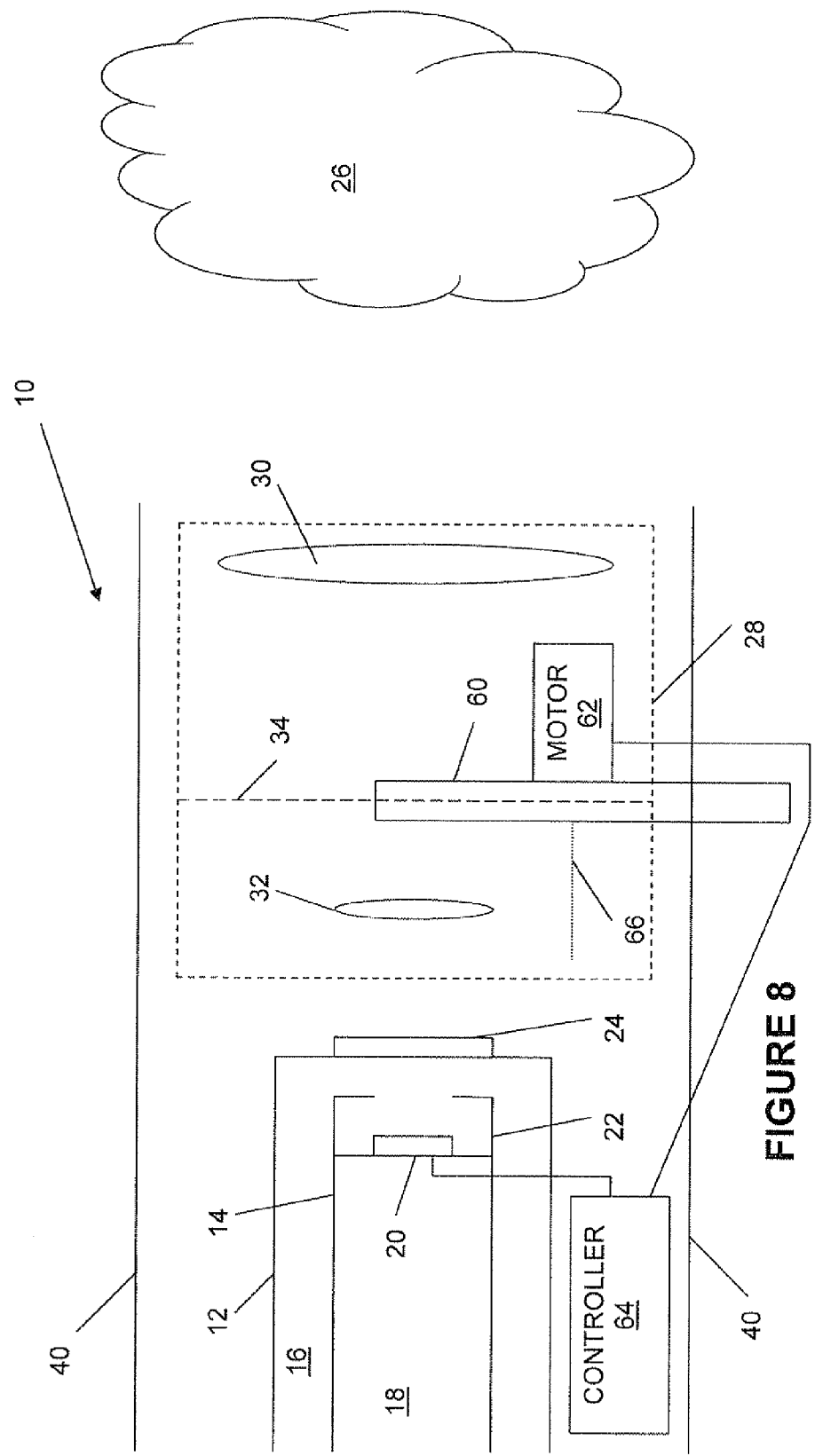

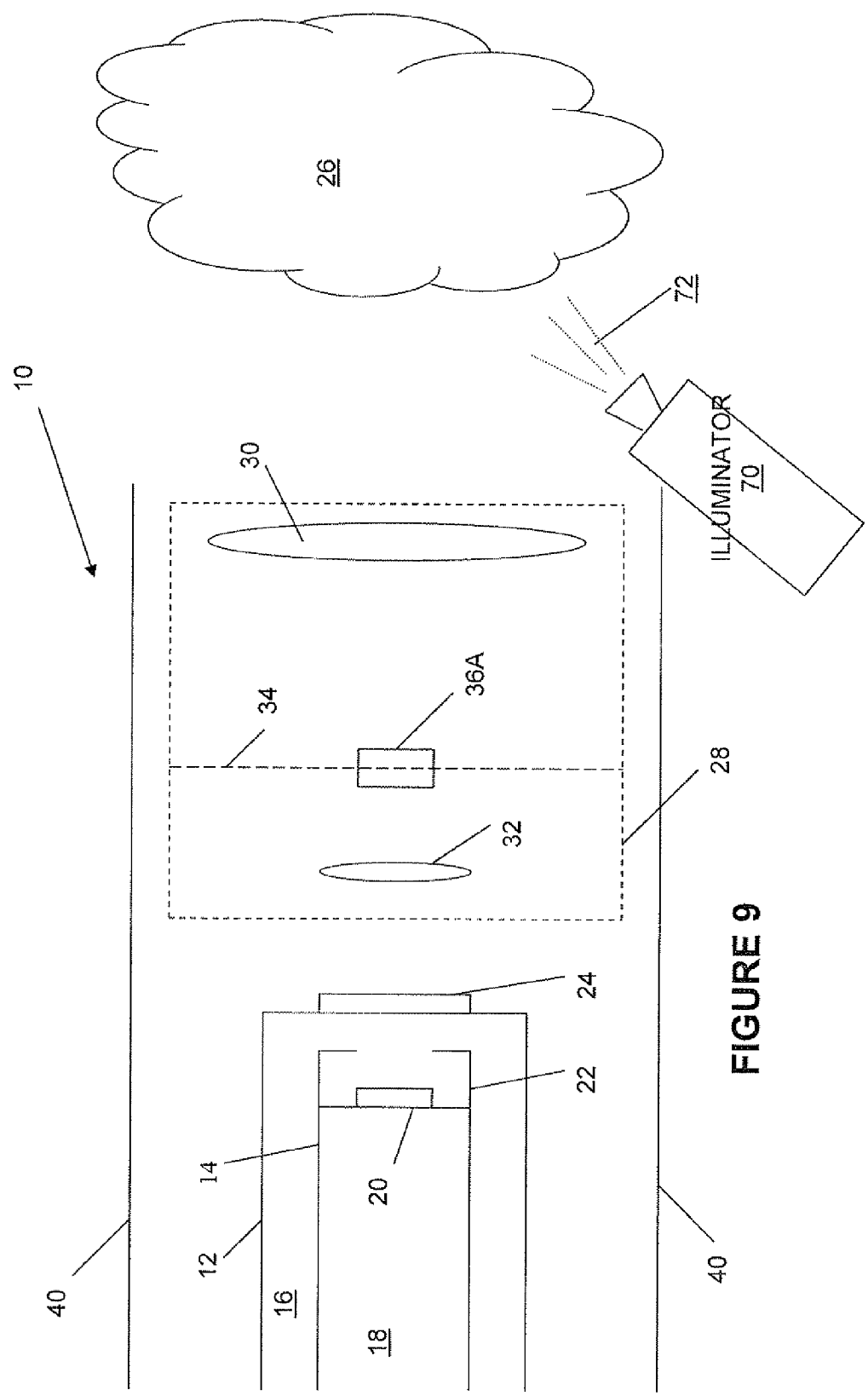

ROOM-TEMPERATURE FILTERING FOR PASSIVE INFRARED IMAGING

This is a continuation-in-part of U.S. patent application Ser. No. 12/853,319, filed Aug. 10, 2010, which is a continuation-in-part of U.S. Provisional Patent Application No. 61/298,569, filed Jan. 27, 2010. This is also a continuation-in-part of U.S. Provisional Patent Application No. 61/487,312, filed May 18, 2011.

FIELD AND BACKGROUND OF THE INVENTION

The present invention relates to the detection and imaging of infrared radiation and, more particularly, to a device, for detecting and imaging infrared radiation, that facilitates the alternation among several uncooled filters in conjunction with a cooled detector of the infrared radiation.

It is well known in the art of thermal imaging infrared sensors based on cooled detector arrays that in order not to flood the detector with unwanted spurious self-emission from the environment two design elements must be present in the system: i) the collecting optics (lenses or mirrors, filters and windows) must be made of non-absorbing infrared transmitting materials in the wavelength range of sensitivity of the detector (so as not to emit appreciable amounts of infrared radiation introducing noise and masking the radiation to be detected), and ii) the entrance pupil of the collecting optics must be imaged on a cold shield aperture present in the cryogenically cooled space inside the detector Dewar, again in order to avoid radiation from the environment to introduce noise and spurious signals. These design rules are necessary because the optical elements, the optics housing of the system as well as the environment emit a large amount of radiation in the infrared range which in general masks the radiation to be detected and originating in the scene to be analyzed. However in many cases and situations, in addition to the imaging optics and windows, there is the need to use a number of spectral filters placed alternately on the optical train in the sensor system, in order to detect and identify and recognize different sources placed in the field of view of the system. These filters may be narrow-band, wide-band, cut-on, cut-off or otherwise spectrally limiting the incoming radiation from the scene, so that these objects can be detected and identified based on their spectral characteristics.

As a result, since a spectral filter may be a source of self-emitted infrared radiation in its own right and may reflect environment radiation into the detector if simply placed in the collection optics train, the common knowledge and practiced art is to place the filter inside the Dewar so as to be cooled to cryogenic temperatures: this insures minimizing the self-emission of the filter and preventing the filter from introducing spurious radiation into the detector. The main disadvantage of this filter cooling method is that once the filter is built into the Dewar it cannot be exchanged for a different one, preventing the possibility of acquiring different successive images of the scene to be analyzed through different narrow wavelengths or through different spectral ranges so that the spectral capability of the system is very limited.

The purpose of the present invention is to provide infrared sensor systems with the advantages of the prior art systems that use cooled detectors and a cooled filter but with the significant advantages of: i) enhanced spectral capability by being able to use a succession of spectral filters or a continuously variable filter (CVF) or a different type of filter plurality, ii) avoidance of cooling the filters, which results in a simpler and less expensive system.

As it is taught in U.S. Pat. No. 5,434,413 to Kennedy, optical filtering in prior art systems based on cooled photon array detectors can be done for example in the following two ways: i) by placing the filter in direct contact with the cooled detector (see Kennedy FIGS. 1b and 1d) so that the filter itself is cooled and its self-emission is very small, and as a consequence its contribution to signal and background noise is minimized; ii) by placing a bandpass filter coating on the vacuum window (see Kennedy FIG. 2), this window being constructed of a non-absorbing material (see Kennedy, end of column 3): the fact that the window is made of non-absorbing material insures here too that the self-emission of the window and as a consequence its contribution to background noise is minimized even if the window is not cooled. In both configurations of the prior art of Kennedy the filter is constructed as a physical part of the vacuum vessel or Dewar, either inside the vessel or being coated or attached on its window. Both these configurations have the following disadvantages (besides the ones mentioned in that patent for the former configuration).

A) These configurations do not allow the use of more than one filter in the system in succession for image detection in more than one spectral range or more than one wavelength (this being the spectral range or the coating of Kennedy FIGS. 1d and 2): in this case, for example, when more than one narrow band signal is needed from each pixel of the image to be measured the filters must be used outside the Dewar on the optical train of the telescope and therefore in general, absent the special innovative improvements of the present invention as described below, the filters will have to be enclosed in an additional vacuum vessel and be cooled in order to avoid their own self-emission.

B) Even with this additional cooling of the filters, reflection of background radiation towards the detector in the unwanted noise contributing spectral range cannot in general be avoided.

C) The filter configuration inside the Dewar of Kennedy FIGS. 1b and 1d usually requires special work from the detector manufacturers because the filter, being application dependent, is not standard and as a consequence a very high price is paid for the Dewar and detector construction.

U.S. Pat. No. 3,770,958 to Krakow teaches the use of a single filter and the use of a series of interchangeable non-emitting uncooled filters placed in front of the Dewar window in a system using a single or multiple stacked detectors (not an imaging array). It is not obvious that such arrangement can be easily extended to the case of imaging array detectors. In fact, in the case of the single filter often there is not enough physical space in front of the window for the filter to be close enough to the Dewar window so that the edge of the array will not receive spurious radiation from the surroundings. The case of a rotating multiple filter wheel in that patent requires a lens to be placed inside the Dewar to be cooled: this is a very expensive and cumbersome proposition.

U.S. Pat. No. 5,408,100 to Gallivan teaches an uncooled non-emitting filter that is a multilayer coating, on the last spherical concave surface of a lens in the optical system, whose radius of curvature is equal to the distance of the surface to the detector. This arrangement produces in general an unwanted ghost image of the array pixels superimposed on the desired image provided by the system due to the fact that the pixels and the surface separating them usually have different reflectivity.

It would be highly advantageous to be able to use more than one filter in the same system for comparison of signals from different spectral ranges and to use a standard infrared cooled-array-camera-based sensor system without an expensive and cumbersome cooling system needed for any of these filters or lenses and with minimal loss of signal to noise ratio or dynamic range in spite of the filters not being cooled.

SUMMARY OF THE INVENTION

According to the present invention there is provided a device for imaging a scene, including: (a) a detector, of radiation from the scene, that includes a plurality of detector elements; (b) a circularly variable filter; (c) a mechanism for rotating the circularly variable filter substantially perpendicular to an optical path of the radiation from the scene to the detector; and (d) a data capture apparatus for: (i) repeatedly interrogating all the detector elements as a group while the mechanism rotates the circularly variable filter, thereby acquiring a plurality of acquired images of the scene, each acquired image including a plurality of image portions, with each image portion being acquired in a respective spectral band of the circularly variable filter, and (ii) assembling the image portions to form a plurality of processed images of the scene with each processed image depicting the scene in a single respective spectral band of the circularly variable filter.

According to the present invention there is provided a method of imaging a scene, including: (a) focusing radiation from the scene onto a detector that includes a plurality of detector elements; (b) rotating a circularly variable filter substantially perpendicular to an optical path of the radiation from the scene to the detector; (c) synchronous with the rotating, repeatedly interrogating all the detector elements as a group, thereby acquiring a plurality of acquired images of the scene, each acquired image including a plurality of image portions, with each image portion being acquired in a respective spectral band of the circularly variable filter, and (d) assembling the image portions to form a plurality of processed images of the scene with each processed image depicting the scene in a single respective spectral band of the circularly variable filter.

According to the present invention there is provided a device for imaging infrared radiation from a scene, including: (a) a detector of the infrared radiation; (b) an enclosure, for keeping the detector at an operating temperature thereof, and including a window that is transparent to the infrared radiation; (c) an optical system, outside of the enclosure, for focusing the infrared radiation through the window onto the detector; (d) a filter having a passband; (e) a mechanism for positioning the filter substantially at an intermediate focal plane of the optical system; and (f) an illuminator for illuminating the scene with infrared radiation in the passband of the filter.

A basic embodiment, of a device for imaging a scene, include a detector of radiation from the scene, a circularly variable filter, a mechanism for rotating the filter substantially perpendicular to the optical path of the radiation from the scene to the detector, and a data capture apparatus. The detector includes a plurality of detector elements. The data capture apparatus repeatedly interrogates all of the detector elements as a group while the rotation mechanism rotates the filter, thereby acquiring a plurality of acquired images of the scene. Each acquired image includes a plurality of image portions, each of which is acquired in a respective spectral band of the filter. Then the data capture apparatus assembles the image portion to form a plurality of processed images of the scene. Each processed image depicts the scene in a single respective one of the spectral bands of the filter. Controller 64 of FIG. 8 below is an example of such a data capture apparatus.

Preferably, the device also includes an optical system for focusing the radiation on the detector. The rotation mechanism rotates the filter substantially in an intermediate focal plane of the optical system. More preferably, the radiation includes infrared radiation, and the device also includes an enclosure for keeping the detector at an operating temperature thereof. The enclosure includes a window that is transparent to the infrared radiation. The optical system focuses the infrared radiation through the window onto the detector. Most preferably, the device also includes one or more baffles for shielding the detector from stray radiation.

Also more preferably, the optical system is telecentric, with respect to an image space of the optical system, at the intermediate focal plane.

In a corresponding method of imaging a scene, radiation from the scene is focused onto a detector that includes a plurality of detector elements. A circularly variable filter is rotated substantially perpendicular to the optical path of the radiation from the scene to the detector. Synchronously with the rotation of the filter, all the detector elements are repeatedly interrogated as a group to acquire a plurality of acquired images of the scene. Each acquired image includes a plurality of image portions. Each image portion is acquired in a respective spectral band of the filter. The image portions are assembled to form a plurality of processed images of the scene, with each processed image depicting the scene in a single respective spectral band of the filter.

Dombrowski et al., in U.S. Pat. No. 5,424,543, teach a device and method for using a circularly variable filter to acquire similar "monochromatic" images in the visible portion of the spectrum in real time, by gating their detector to acquire the images synchronously with the rotation of the filter. In the present invention, the acquired images are multichromatic, and are disassembled and reassembled to provide the final "monochromatic" images. The present invention is intended primarily for use in the min-infrared portion of the electromagnetic spectrum. Presently known detectors for that portion of the electromagnetic spectrum are not fast enough to acquire images in real time, as in the Dombrowski et al. patent, but the present invention enables relatively fast acquisition, albeit not in real time, of multispectral or hyperspectral images, in a portion of the electromagnetic spectrum that is not accessible to the device and method of the Dombrowski et al. patent.

A basic embodiment, of a device for imaging infrared radiation from a scene, includes a detector of the infrared radiation, an enclosure, an optical system outside the enclosure, a passband filter, a mechanism for positioning the filter at or near an intermediate focal plane of the optical system, and an illuminator. The enclosure is for keeping the detector at its operating temperature, which normally is lower than both the ambient temperature of the environment of the device and the temperature of the scene. For example, if the detector is a photon detector, the detector must be kept at cryogenic temperatures in order to work. The enclosure includes a window that is transparent to the infrared radiation. The optical system is for focusing the infrared radiation through the window onto the detector. The illuminator is for illuminating the scene with infrared radiation in the filter's passband.

Preferably, the device includes a plurality of such filters, with each filter having a different respective passband. The positioning mechanism alternately and reversibly positions each filter at the intermediate focal plane. When each filter is so positioned at the intermediate focal plane, the illuminator is used to illuminate the scene with infrared radiation whose wavelengths are confined to the filter's passband.

BRIEF DESCRIPTION OF THE DRAWINGS

Various embodiments are herein described, by way of example only, with reference to the accompanying drawings, wherein:

FIGS. 7 and 8 illustrate the use of the device of FIG. 1 with a circularly variable filter;

FIG. 9 illustrates the use of the device of FIG. 1 along with an illuminator for illuminating the imaged scene.

DESCRIPTION OF THE PREFERRED EMBODIMENTS

Figure 1:
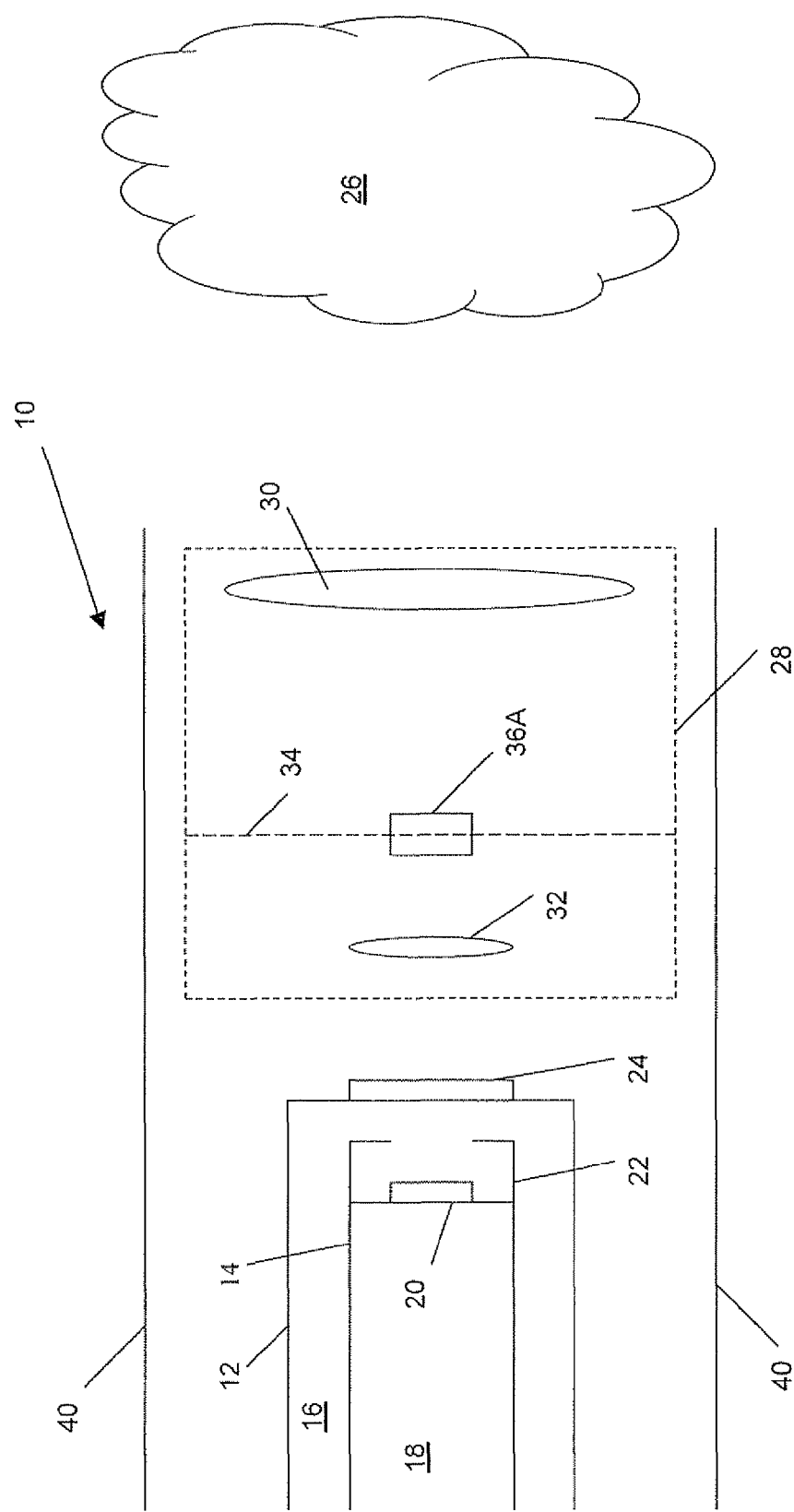
FIG. 1 shows a first embodiment of a device of the present invention.

The principles and operation of a device for detecting and imaging infrared radiation according to the present invention may be better understood with reference to the drawings and the accompanying description.

The present invention is specifically directed to a new way of successively filtering spectral ranges of detected infrared radiation that avoids cooling the filters themselves, and at the same time does not lose appreciably the low noise advantage given by this cooling and adds the advantage of easily scanning through different wavelengths of filtering in a compact and less expensive fashion than in the prior art.

The traditional stand-off detection and identification of objects exhibiting narrow spectral absorption features in the infrared region of the spectrum are done by instrumentation which is capable of sensing either spectral radiation intensity as function of wavelength in a wide spectral range, or material specific radiation selected by a specific spectral filter in a narrow characteristic region of the spectrum appropriate for that material. This is so because the functional shape of this wavelength dependent radiation intensity is directly related to the specific spectral characteristics of the material and to its chemical composition and can be used for its detection, recognition or identification and imaging. In contrast, an instrument without a spectral capability, such as an infrared radiometric camera, measuring or displaying only the integral of the radiation emitted by a scene within a whole spectral range, cannot distinguish between different compositions or types of materials, because in this case the signal is only correlated to the temperature and average emissivity of the material in question, and does not yield material-specific information.

Therefore, it would be desirable to have an infrared optical detection system with an infrared cooled detector array which is capable of imaging infrared radiation emitted by objects to be identified and located by detecting and comparing the objects' spectral features or emissions in different spectral narrow wavelength bands in a relatively simple and inexpensive opto-mechanical configuration.

Many types of radiation measuring instrumentation have been developed and sold for this purpose for many years, with partial or full spectral capability. Some types of instrumentation are quite complex in their design and manufacturing due to the need for means of optically dispersing (by way of prisms, gratings, etc. subsystems) or i handling (by way of an interferometer) the measured radiation interacting with the object to be detected. This fact makes this type of instrument usually large, heavy and expensive. Simpler instrumentation is based on spectrally specific radiation filtering; this requires that the filter be cooled to cryogenic temperatures in case this filtering is done by full or partial absorption of the radiation being filtered and the filter placed in the Dewar right in front of the detector; otherwise the detector may be flooded by a large unspecific signal due to the filter's own infrared self emission or originated by the environment and reflected by the filter, making it impossible for the sought-after signal to be detected. This need for cooling the filter complicates the design and implementation of the instrument.

According to the present invention the detection and imaging of a specific material (such as a gas cloud or terrain in geological analysis or other infrared spectrally active material) from a distance is done with an array-based infrared camera combined with material-specific filtered optics, avoiding the cooling of the filter and at the same time providing either a partial or full spectral capability for single or multiple material identification without losing most of the noise reduction advantage of the filter cooling. The solution is provided by several, elements: i) any filter in the system is designed in such a way that in the wavelength range of sensitivity of the detector the filter barely absorbs any radiation, for minimum self-emission, ii) an optical design of the system that insures that the only spurious radiation reaching the detector in addition to the specifically filtered radiation from the object to be studied is radiation originating from the cooled region of the detector itself or from a cold region within the Dewar, therefore being negligible; this can be achieved, for example, with a non-absorbing filter on a non-absorbing substrate (single or multiple on a rotating filter wheel, or a continuously circular variable spectral filter, so called CVF, or linearly variable spectral filter, so called LVF) placed in or near an intermediate image plane of the collecting optics and combined with relay optics to image the intermediate image plane on the detector array, or with a non-absorbing filter coating on a concave spherical lens surface (also usually combined with additional optics for imaging on the detector array) placed at a distance from the cold shield equal to the radius of curvature of this surface; and iii) a cooled detector-array-based infrared camera: in fact, the self-emission of the array is negligible in this case because it is cooled and therefore it may be used as background to the signals to be detected without appreciably contributing to those signals and to background noise. Reflecting baffles may be necessary to prevent residual stray radiation from reaching the detector.

A system of the present invention, for sensing infrared signals in a single or a plurality of specific narrow spectral regions of the infrared spectrum in succession, is designed so that almost all the signal recorded by the detector is only from two possible sources: the object-specific self-emission to be identified in the wavelength range(s) of transmission of the filter or filters (allowing identification), and a very small signal emitted by the cooled detector or cold region within the Dewar as background with no other or almost no other spurious contribution from the environment.

Referring now to the drawings, FIG. 1 shows a first embodiment 10 of a device for imaging a scene 26, such as a gas cloud, in the infrared region of the electromagnetic spectrum. The imaging itself is done by a photon detector array 20 that is cooled by the conventional method of being mounted on a cold finger 14 inside a Dewar 12. Cooling is provided by a cryogenic fluid 18 such as liquid nitrogen inside cold finger 14. Alternatively, cooling is provided by a closed-cycle cooling system such as a Stirling cooler, also to the 77° K temperature of boiling liquid nitrogen. Detector array 20 is insulated thermally from the outside environment of device 10 by the vacuum 16 of Dewar 12. Detector array 20 is further shielded from stray infrared radiation by a cold shield 22 that is cooled by thermal contact with cold finger 14. Infrared radiation from scene 26 is focused on detector array 20 through a window 24 by a telescope 28 whose optical components are represented symbolically in FIG. 1 by lenses 30 and 32. (Each of "lenses" 30 and 32 actually is a set of one or more lenses that is represented in FIG. 1 by a single lens.) Window 24 and optical components 30 and 32 are made of materials, such as germanium, zinc sulfide or zinc selenide, that is transparent in the infrared. The surfaces of window 24 and optical components 30 and 32 are coated with antireflection coatings.

For clarity of illustration, the image acquisition electronics associated with detector array 20 are not shown in FIG. 1.

A filter 36A is positioned in the optical path of telescope 28 at or near an intermediate focal plane 34 of telescope 28 so that all the rays from scene 26 that are focused on detector array 20 by telescope 28 pass through filter 36A.

Figure 2:
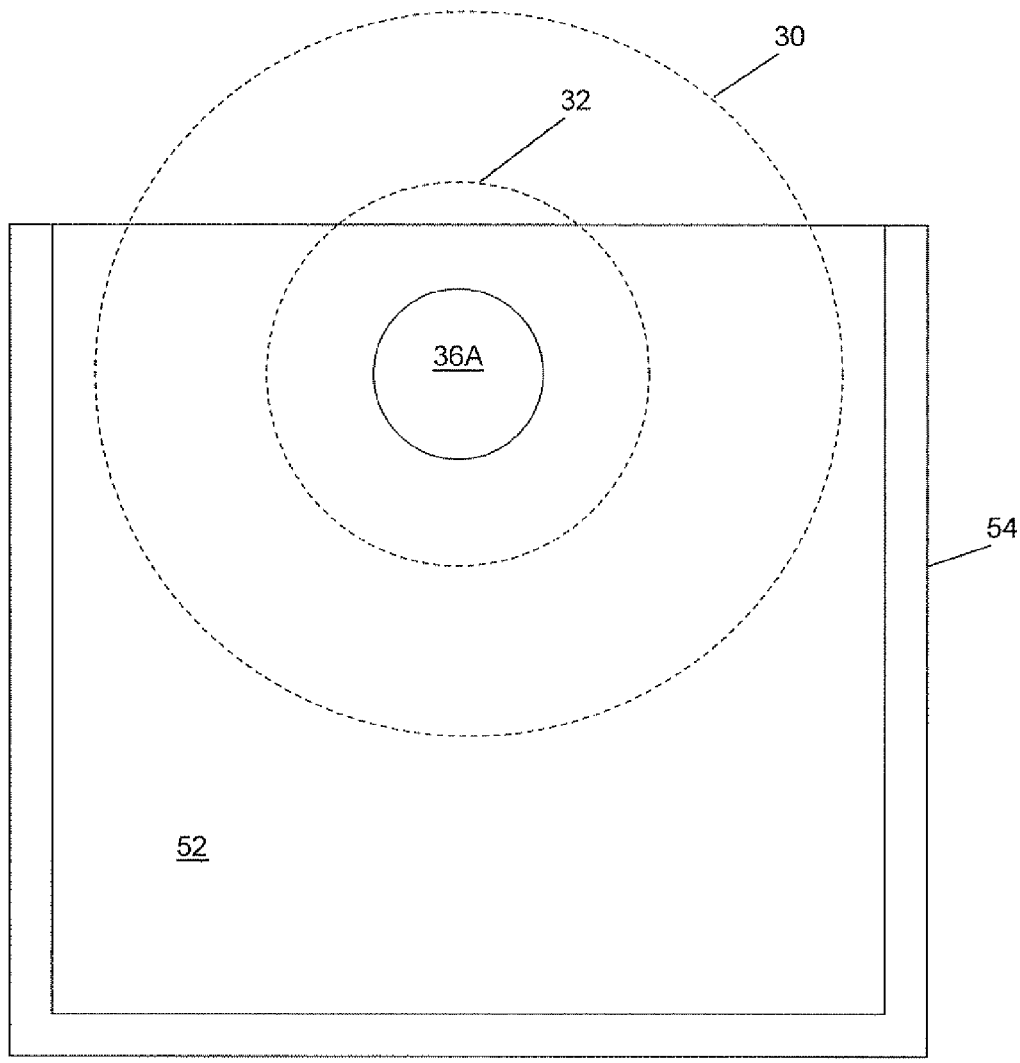
FIG. 2 shows a filter mounted on a holder and inserted in a bracket at the intermediate focal plane of the device of FIG. 1.

FIG. 2 shows one way of positioning filter 36A in the optical path of telescope 28 at intermediate focal plane 34. Device 10 is provided with a bracket 54 for holding a rectangular holder 52, in which filter 36A is mounted, substantially coincident with intermediate focal plane 34. The positions of lenses 30 and 32 relative to holder 52, when holder 52 is inserted into bracket 54 with filter 36A in the optical path of telescope 28 as shown in FIG. 1, are shown in FIG. 2 in phantom. As long as card 52 is mounted inside bracket 54 as shown, filter 36A is fixed in place in the optical path of telescope 28 at intermediate focal plane 34. Similar holders, having mounted therein other filters 36B, 36C, 36D, etc., are also provided, so that filter 36A can be swapped for the other filters, for example for detection of a gas by comparison of images at different wavelengths or for identification of different materials with different spectral features.

Figure 3:
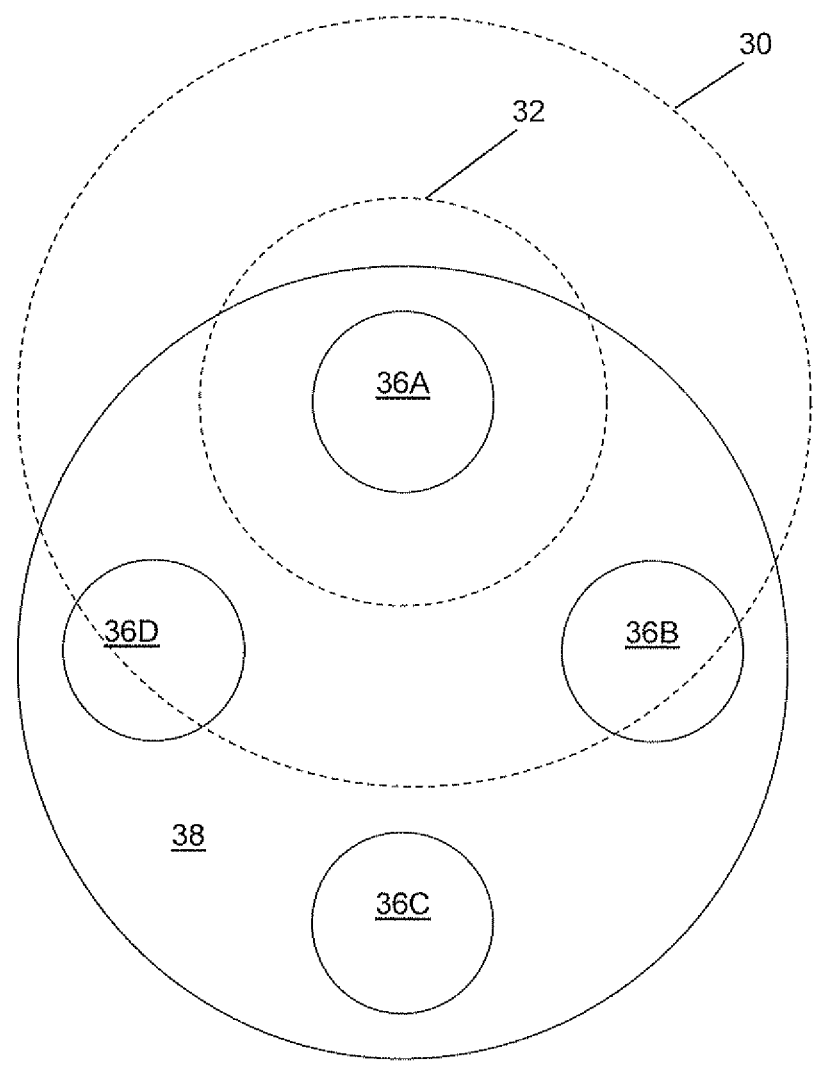
FIG. 3 shows a filter wheel for use in conjunction with the device of FIG. 1.

FIG. 3 shows another way of positioning filter 36A in the optical path of telescope 28 at intermediate focal plane 34. In FIG. 3, filter 36A is one of four filters 36A, 36B, 36C and 36D that are mounted on a filter wheel 38. Filter wheel 38 is mounted in device 10 substantially coincident with intermediate focal plane 34 and is rotated about its center to position one of filters 36A, 36B, 36C or 36D, as desired, in the optical path of telescope 28. The positions of lenses 30 and 32 relative to filter wheel 38, when filter 36A is in the optical path of telescope 28 as shown in FIG. 1, are shown in FIG. 3 in phantom. That filter wheel 38 includes only four filters 36 is only for illustrational clarity. Filter wheel 38 may include as many filters as is convenient, for example for detection of a gas by comparison of images at different wavelengths or for identification of different materials with different spectral features.

Alternatively, the filter that is positioned in the optical path of telescope 28 at intermediate focal plane 34 is a circular variable filter having a continuously variable transmitted wavelength around its circumference or a linearly variable filter having a continuously variable transmitted wavelength along one of its dimensions perpendicular to the optical path of telescope 28.

All the filters of the preferred embodiments are filters such as interference filters that do not appreciably absorb and emit radiation within the spectral window of sensitivity of detector array 20.

Figure 4:
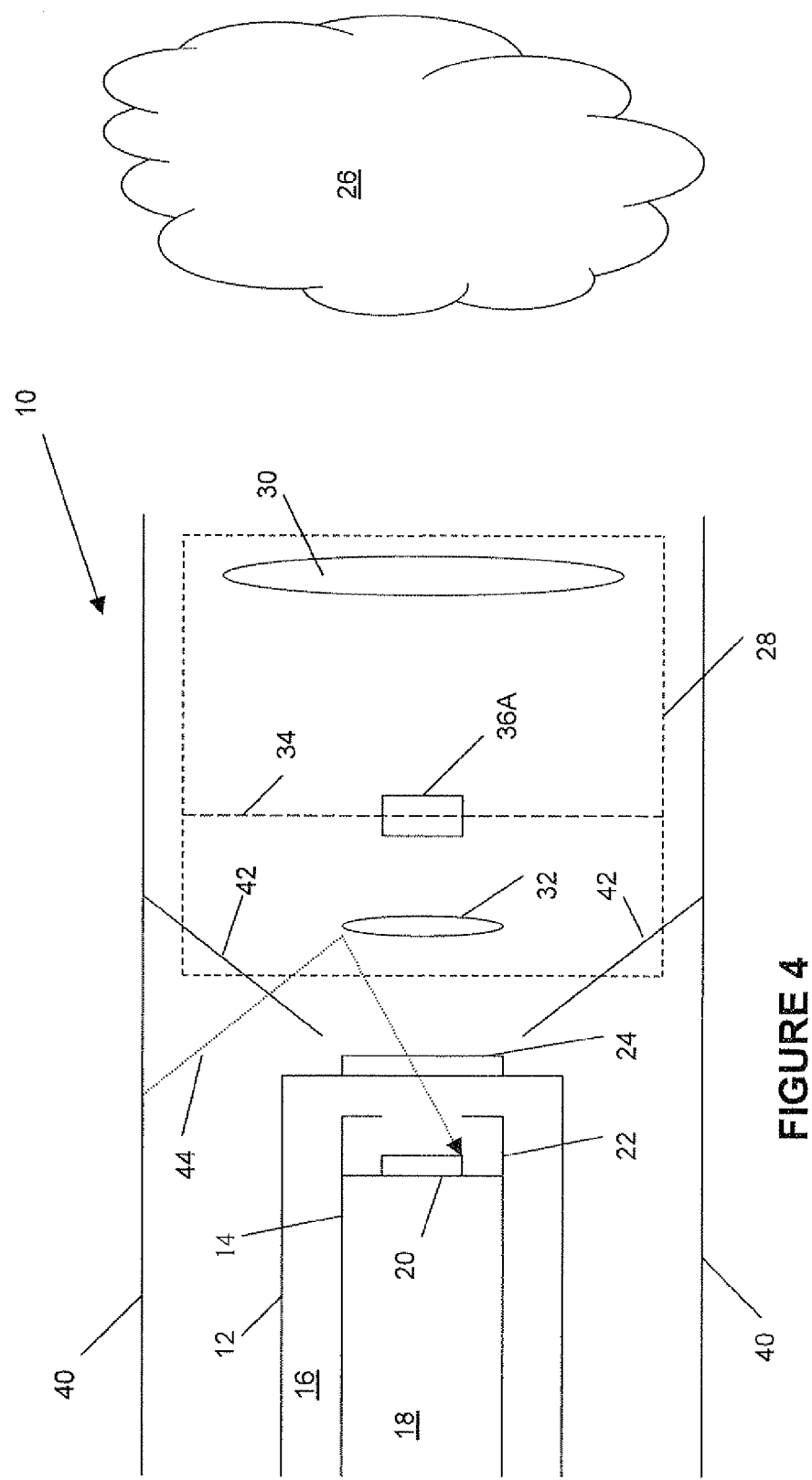
FIG. 4 shows a variant of the device of FIG. 1 that includes a baffle for blocking stray radiation.

FIG. 4 shows a variant of the embodiment of FIG. 1 in which a baffle 42 has been added to keep infrared radiation that originates in the environment of device 10 from reaching detector array 20. The example of such self-emission that is shown in FIG. 4 is a ray 44 from one of the internal walls 40 of device 10. Baffle 42 is a highly reflective mirror on the side that faces telescope 28, and in this example is shaped like the frustum of a cone, with an aperture in its center. A baffle such as baffle 42 that prevents stray radiation from reaching detector array 20 is more important for the detector elements near the edges of detector array 20 than for the detector elements towards the middle of detector array 20.

Alternately or additionally, spurious radiation is prevented from reaching detector array 20 by configuring telescope 28 with optics that are telecentric with respect to the image space of telescope 28 at intermediate focal plane 34 so that the central rays from scene 26 are perpendicular to filter 36A. Such a telecentric arrangement is equally beneficial for both the detector elements near the edges of detector array 20 and the detector elements towards the middle of detector array 20.

Figure 5:
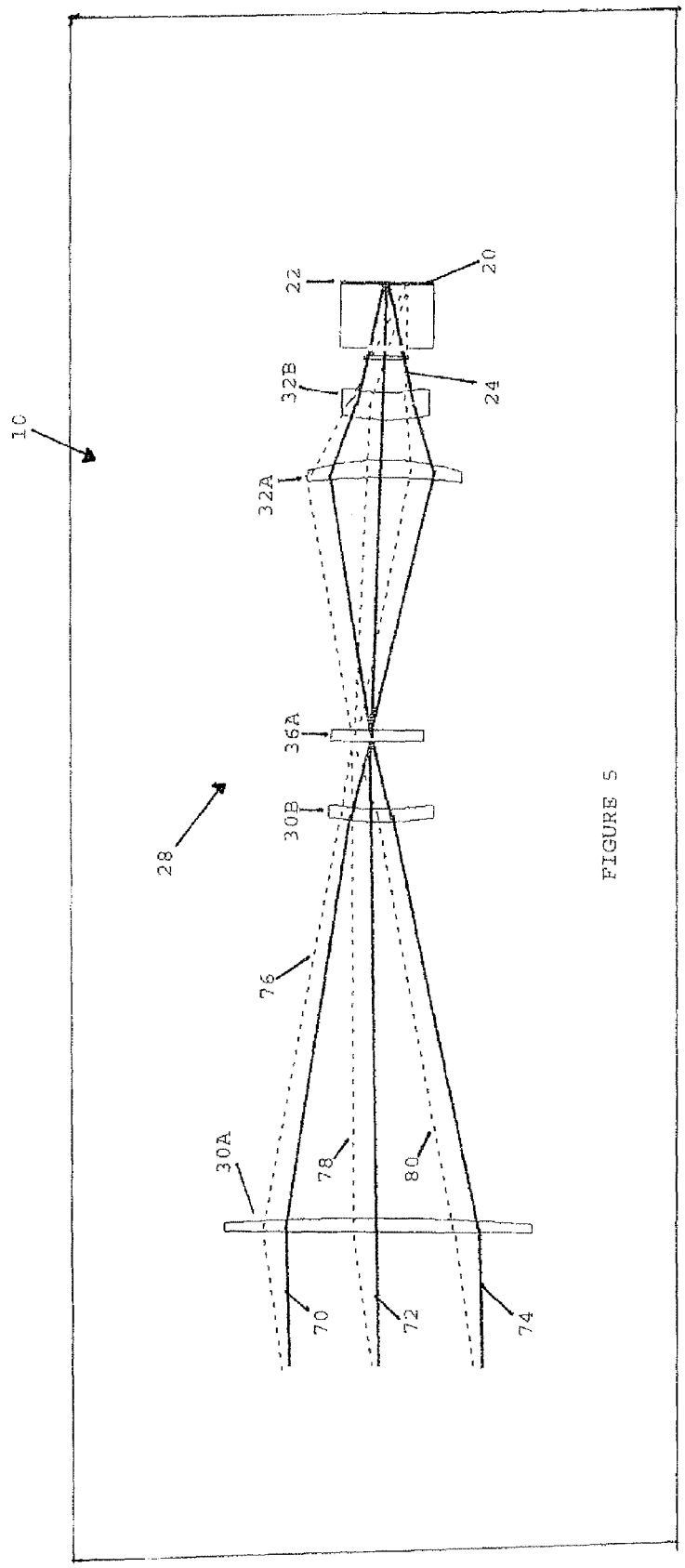
FIG. 5 shows a telecentric variant of the device of FIG. 1.

FIG. 5 illustrates such a telecentric variant 10 of embodiment 10, with two objective lenses 30A and 308 and two relay lenses 32A and 32B in telescope 28. Rays 70, 72 and 74 from the center of a distant scene are focused on the center of detector array 20. Rays 76, 78 and 80 from one side of the scene are focused towards an edge of detector array 20. The central rays, rays 72 and 78, are perpendicular to filter 36A. Such a design guarantees that while all the light from the scene that traverses filter 36A is focused onto detector array 20 any other light reflected by filter 36A towards detector array 20 is negligible because that light originates in a cold region, i.e., the region near the detector itself, which region is kept chilled by cryogenic fluid 18 of FIG. 1.

The baffles of FIG. 4 and the telecentric arrangement of FIG. 5 minimize the light that is reflected by filter 36A towards detector array 20. Such reflected light is the principal contribution to stray light because filter 36A, being highly reflective for all wavelengths except the wavelengths for which filter 36A is highly transmissive, acts as a mirror for those wavelengths and may easily direct a large number of unwanted photons from the environment of device 10 to detector array 20. The other components in the optical train, such as lenses 30 and 32, are coated with antireflection coatings for the same purpose.

Figure 6:
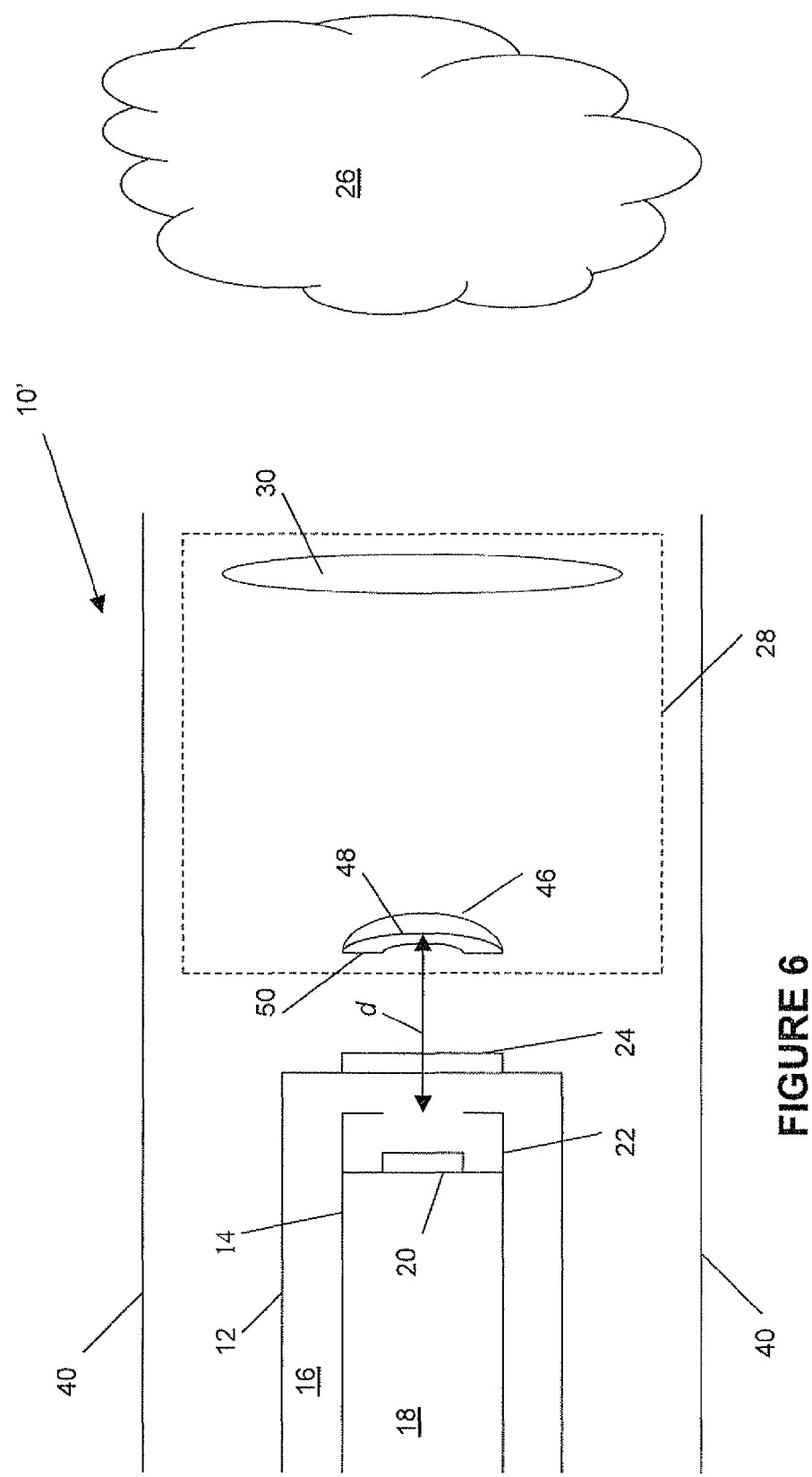
FIG. 6 shows a second embodiment of a device of the present invention.

FIG. 6 shows a second embodiment 10' of a device for imaging scene 26. Embodiment 10' is similar to embodiment 10 except that in telescope 28 lens 32 has been replaced with a set 46 of one or more lenses whose surface 48 closest to detector array 20 is concave towards detector array 20. Here, the filter is not a separate optical element from the focusing optics of telescope 28 but rather a non-absorbing coating 50 on surface 48. For clarity of illustration, the thickness of coating 50 is greatly exaggerated in FIG. 6. The radius of curvature of surface 48, and so of coating 50, is equal to the distance d between surface 48 and the aperture of cold shield 22 along the optical axis of telescope 28. In this case there is no need for the optics of telescope 28 to include an intermediate focal plane, but the successive detection of the radiation through a plurality of filters is possible only by replacing lens set 46, or at least by replacing the lens of set 46 closest to detector array 20, which is a more cumbersome method than the methods used with the embodiments of FIGS. 1-5.

The advantage of having cold shield 22 being imaged by surface 48 and filter 50 onto cold shield 22 itself, rather than onto detector array 20 as in the device of Gallivan, is that the design of FIG. 6 maintains the purpose of having a cold region being reflected by surface 48 and filter 50 onto detector array 20 without introducing a spurious ghost pattern onto the image acquired by detector array 20 due to the non-uniform emissivity of the detector plane.

Like device 10, device 10' may optionally include one or more baffles to prevent stray emission from the environment from reaching detector array 20.

Figure 7:
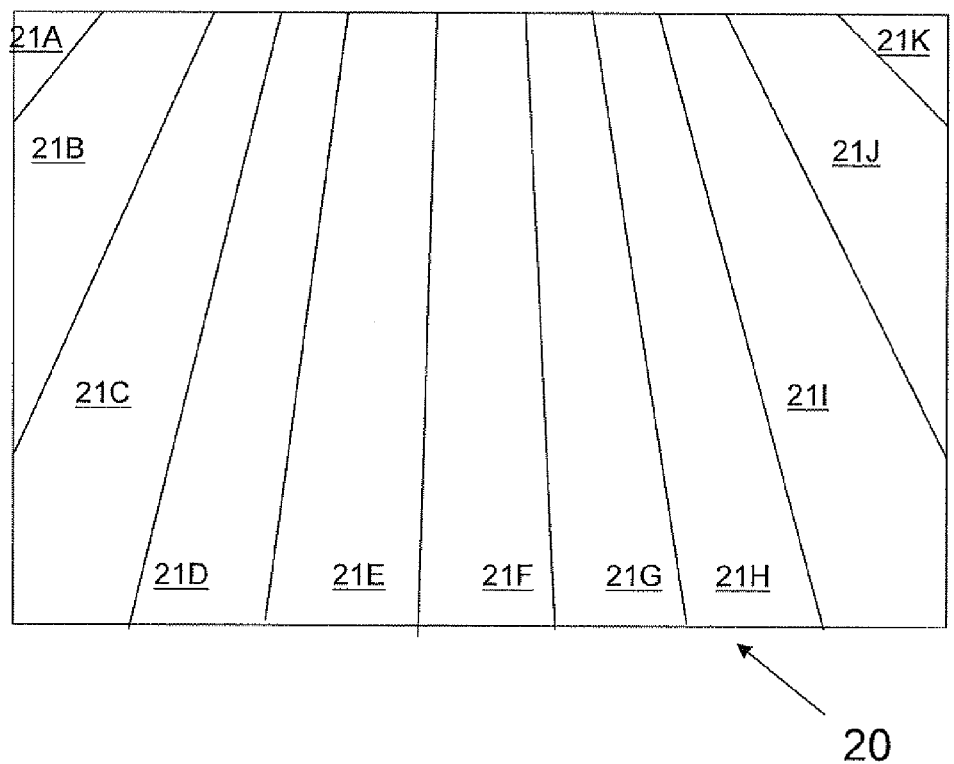

Returning to the embodiment of FIG. 1, FIG. 7 illustrates a most preferred mode of using this embodiment with a circular variable filter at intermediate focal plane 34 to acquire a spectral cube, i.e., a set of images of scene 26 at more-or-less equally spaced wavelengths. Strictly speaking, what is illustrated is a slightly less preferred mode of using the circular variable filter. At any position of the filter, a small number of adjacent spectral bands of light from the scene are focused on respective trapezoidal or triangular regions 21 of detector array 20. Regions 21 are of approximately equal angular width. (That regions 21 are not of equal angular width is due to the fact that in practice the spectral resolution of a circular variable filter varies with wavelength.) In the illustrated example, there are eleven such regions, 21A through 21K. Region 21A receives light of a first spectral band, region 21B receives light of a second spectral band, etc. and region 21K receives light of an eleventh spectral band. Each region 21 of detector array 20 is used to acquire a sub-image of a respective portion of scene 26 in the respective spectral band of that region 21. Then the circular variable filter is rotated so that region 21A receives light of the second spectral band, region 21B receives light of the third spectral band, etc., region 21J receives light of the eleventh spectral band, and region 21K receives light of a twelfth spectral band. Again, each region 21 of detector array 20 is used to acquire a sub-image of a respective portion of scene 26 in the respective spectral band of that region 21. The stepwise or continuous rotation of the circular variable filter and the associated imaging and storage of successive array frames are continued until all or a sufficiently large number of the adjacent spectral bands in the wavelength range of the CVF have been imaged in all regions 21. If the filter "wraps around", which is the case if, for example, the filter occupies a full circle or each of two identical filters occupies a half circle, in the acquisition of the last acquired image, when region 21A receives light of the last spectral band, region 21B is receiving light of the first spectral band, region 21C is receiving light of the second spectral band, etc. and region 21K is receiving light of the tenth spectral band. If the filter does not wrap around, the same full spectral coverage still can be obtained, albeit not as quickly, by a sufficient rotation of the filter. Then all the sub-images that were acquired in the first spectral band are assembled to create an image of the entire scene 26 in the first spectral band, all the sub-images that were acquired in the second spectral band are assembled to create an image of the entire scene 26 in the second spectral band, and so on through the spectral bands past the second spectral band, until finally all the sub-images that were acquired in the last spectral band are assembled to create an image of the entire scene 26 in the last spectral band.

In the actual most preferred mode of using a circular variable filter, instead of stepwise rotation of the circular variable filter the circular variable filter is rotated continuously at an angular speed of one region 21 per frame. So, for example, if the angular width of each region 21 corresponds to a two-degree rotation of the circular variable filter, each image is acquired during each such two-degree rotation of the circular variable filter.

In a typical configuration of the first embodiment with a circular variable filter, the overall passband of the filter is between 8 microns and 12 microns. The filter resolution is 0.5%, so that there are 100 filter resolution elements in the filter's 8 to 12 micron passband. The active area of the filter includes two half-rings of 42 millimeter radius, for a length of 132 millimeters per half-ring. Each half-ring spans the 8 to 12 micron passband, so each filter resolution element has an angular size of 1.8 degrees. Correspondingly, the angular size of each region 21 is 1.8 degrees. Detector array 20 has a maximum frame rate of 250 Hz.

The steps in the acquisition of a 100-image spectral cube then are as follows. Every four milliseconds, an image is recorded using detector array 20, while rotating the filter by 1.8 degrees. This combined image recording and filter rotation is repeated 100 times while recording the images in a memory. In this manner, five spectral cubes are acquired every two seconds.

FIG. 8 is FIG. 1 enhanced to illustrate more completely the embodiment of FIG. 1 configured for this most preferred mode of using a circularly variable filter. Specifically, in FIG. 8, filter 36A has been replaced with a circularly variable filter 60 that is rotated by a motor 62 about an axis 66. A system controller 64 uses detector array 20 to acquire images of scene 26 and synchronizes the rotation of filter 60 with the acquisition of the images as described above. After acquiring a sufficiently large number of images, system controller 64 dissects and reassembles the acquired images to produce the desired set of "monochromatic" processed images of scene 60.

After all the spectral image data elements have been stored in a computer memory as a "spectral cube", the stored data can be analyzed in many ways. Just as each element of a two-dimensional image is a "pixel", so each element of a (three-dimensional) spectral cube is a "voxel". Each set of voxels associated with a particular image pixel coordinate pair is a spectrum associated with an image pixel of scene 26. One way to display a summary of a spectral cube is to compare each such spectrum with a set of reference spectra of known materials and to assign each pixel of the image of scene 26 a respective color according to which reference spectrum the pixel's spectrum most closely resembles.

FIG. 9 illustrates a most preferred mode of using a single filter 36A, or a set of discrete filters such as the set 36A through 36D on filter wheel 38 of FIG. 3, in conjunction with auxiliary illumination of scene 26. Specifically, FIG. 9 includes, in addition to the components illustrated in FIG. 1, an illuminator 70 for illuminating scene 26 with infrared light 72 as described below.

In some security (and other) applications the spatial distribution of certain chemical materials, such as drugs, explosives, etc. is detected on clothes, suitcases and other objects by illuminating the object with incoherent or laser light in the thermal infrared region between about seven to fourteen microns or sub-bands thereof and by imaging the backscattered light with an infrared camera sensitive in the same wavelength range. The illumination (coherent or not) may be of a single wavelength or it may be tunable in a continuous range or in a number of discrete wavelengths in the range.

In general, images of the same object illuminated at different wavelengths are compared mathematically and the detection, identification and spatial distribution of such chemicals are obtained by using advanced calibration and detection algorithms applied to those images. These algorithms take advantage of the different spectral signatures of these sought for chemicals with respect to common materials such as plastics, wood, metals, paints, clothing materials like cotton, wool etc.

Typical distances reported in the literature at which this method works (for example see "Imaging standoff detection of explosives using widely tunable mid-infrared quantum cascade lasers" by Frank Fuchs et al., Optical Engineering 49 (11) p. 111127 (2010)) are several centimeters to several meters.

It is well known that many parameters of the measurement conditions may affect the detection accuracy (sensitivity and specificity) and the longest distance at which the method is useful. These parameters include the laser average power (if a laser is used for illumination), the spectral reflection characteristics of the object and the chemical, the speckle noise, the camera noise, the background noise, etc.

The embodiment of FIG. 9 is useful in the case in which the dominant limiting factor of the chemicals' detection is the background signal and noise due to the self-emission of the object being studied and of the background self-emission reflected by the object being studied into the imaging camera. This radiation is of blackbody type at room temperature and therefore it does not carry any specific information on the chemical to be detected: as a result, it represents an unwanted contribution to the camera signals. The intensity of this radiation limits the dynamic range of the measurement, while the shot noise due to the self-emitted photons limits the signal to noise ratio of the recorded signals, affecting the discrimination limits of the signatures in question.

Configuring the imaging camera as illustrated in FIG. 9 significantly improves the results and the detection limits of the system itself with respect to the case in which a simple thermal camera is used as the imaging device. In the case that wide band or filtered incoherent illumination or a laser is used at a single wavelength the embodiment of FIG. 9 yields these improved results with one single filter 36A at a wavelength matched to the filtered source or the laser while recording the object image. In the case that the laser or filtered incoherent wide band source is tuned to a sequence of wavelengths, filter wheel 38 (or, equivalently, a continuously variable filter that is large enough, compared to the image focused on detector array 20, that there is only one region 21) is the relevant solution. In this case wavelength matching and synchronization must be added to system 10 to rotate filter wheel 38 so that filter wheel 38 is positioned on the optical train at the same wavelength as the instantaneous wavelength of the filtered source or tuned laser. The advantage provided by the "Cold Filter" idea, which consists in not being cryogenically cooled and at the same time not contributing self-emission to the signals, is also important.

By limiting the imaging of the object and background self-emission (superimposed on the backscattered radiation of the source) to the narrow bandpass of the instantaneous single filter 36 this unwanted signal is reduced by a large factor. This factor depends on the value of the filter bandwidth and on the wavelength range of sensitivity of detector 20. For example, at 25° C. the Planck function radiance integrated in the 7 to 12 micron range is:

$$W_{25C,7-12}=2.2\times10^{-2}\ \text{Watts}/(\text{cm}^2\cdot\text{sr}),\quad(1)$$

whereas the integral of the Planck function radiance in a range of width 0.044 microns around 7.4 microns is $$W_{25C,7.4}=2.4\times10^{-4}\ \text{Watts}/(\text{cm}^2\cdot\text{sr}).\quad(2)$$

(2) is a factor of about 100 less than (1). Since filter 36, due to its own design, hardly contributes any self-emission itself in the wavelength range in consideration, this is enough to prove the improvement brought about by this method.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A device for imaging a scene, comprising:
   (a) a detect of radiation from the scene, said detector including a plurality of detector elements, the radiation including a plurality of wavelength bands;
   (b) a circularly variable filter;
   (c) an optical system for focusing all the wavelength bands of said radiation onto said detector, said optical system including a first optical component and a second optical component;
   (d) a mechanism for rotating said circularly variable filter substantially perpendicular to an optical path of said radiation from the scene to said detector, and in an intermediate focal plane of said optical system, said intermediate focal plane being between said first and second optical components of said optical system; and
   (e) a data capture apparatus for:
      (i) repeatedly interrogating all said detector elements as a group while said mechanism rotates said circularly variable filter, thereby acquiring a plurality of acquired images of the scene, each said acquired image including a plurality of image portions, with each said image portion being acquired in a different respective spectral band of said circularly variable filter, and
      (ii) assembling said image portions to form a plurality of processed images of the scene with each processed image depicting the scene in a single said respective spectral band of said circularly variable filter.

2. The device of claim 1, wherein said radiation includes infrared radiation, the device further comprising:
   (f) an enclosure, for keeping said detector at an operating temperature thereof, and including a window that is transparent to said infrared radiation;
   and wherein said optical system focuses said infrared radiation through said window onto said detector.

3. The device of claim 2, further comprising:
   (g) at least one baffle, separate from said circularly variable filter, for shielding said detector from stray radiation.

4. The device of claim 1, wherein said optical system is telecentric, with respect to an image space of said optical system, at said intermediate focal plane.

5. A method of imaging a scene, comprising:
   (a) focusing all wavelength bands of radiation from the scene onto a detector that includes a plurality of detector elements using an optical system, the optical system including a first optical component and a second optical component;
   (b) rotating a circularly variable filter substantially perpendicular to an optical path of said radiation from the scene to said detector, and in an intermediate focal plane between said first and second optical components;
   (c) synchronous with said rotating, repeatedly interrogating all said detector elements as a group, thereby acquiring a plurality of acquired images of the scene, each said acquired image including a plurality of image portions, with each said image portion being acquired in a different respective spectral band of said circularly variable filter, and
   (d) assembling said image portions to form a plurality of processed images of the scene with each processed image depicting the scene in a single said respective spectral band of said circularly variable filter.

6. A device for imaging infrared radiation from a scene, the radiation including a plurality of wavelength bands, the device comprising:
(a) a detector of the infrared radiation;
(b) an enclosure, for keeping said detector at an operating temperature thereof, and including a window that is transparent to the infrared radiation;
(c) an optical system, outside of said enclosure, for focusing all the wavelength bands of the infrared radiation through said window onto said detector, said optical system including a first optical components and a second optical component;
(d) a filter having a passband;
(e) a mechanism for positioning said filter substantially at an intermediate focal plane of said optical system and substantially perpendicular to an optical path of the radiation from the scene to said detector, said intermediate focal plane being between said first and second optical components of said optical system; and
(f) an illuminator for illuminating the scene with infrared radiation in said passband of said filter.

7. The device of claim 6, comprising a plurality of said filters, each said filter having a different respective passband; wherein said mechanism is operative to alternately and reversibly position each of said filters at said intermediate focal plane; and wherein, when each said filter is positioned at said intermediate focal plane, said illuminator is operative to illuminate the scene with infrared radiation only in said passband of said each filter.

8. The device of claim 1, wherein said circularly variable filter is substantially planar and wherein said optical path is substantially perpendicular to said plane of said circularly variable filter.

9. The method of claim 5, wherein said circularly variable filter is substantially planar and wherein said optical path remains substantially perpendicular to said plane of said circularly variable filter as said circularly variable filter is rotated.

10. The device of claim 6, wherein: said illuminator is operative to illuminate the scene with monochromatic light.

11. The device of claim 6, wherein said filter is a circularly variable filter.

12. The device of claim 6, wherein said illuminator is operative to illuminate the scene with monochromatic light; and wherein said filter is a circularly variable filter; and wherein said mechanism is configured for rotating said circularly variable filter substantially in an intermediate focal plane of said optical system, such that at least one of said detector elements corresponds to an instantaneous wavelength of said illuminator.

13. The device of claim 12, further comprising:
(g) a data capture apparatus for:
(i) repeatedly interrogating all said detector elements as a group while said mechanism rotates said circularly variable filter, thereby acquiring a plurality of acquired images of the scene, each said acquired image including a plurality of image portions, with each said image portion being acquired in a spectral band of said circularly variable filter corresponding to said illuminator instantaneous wavelength, and
(ii) assembling said image portions to form a plurality of processed images of the scene with each processed image depicting the scene in a spectral band of said circularly variable filter corresponding to said illuminator instantaneous wavelength.

14. The device of claim 12, wherein said illuminator is further operative to illuminate the scene with monochromatic light of a plurality of wavelengths, and said device further comprising:
(g) a data capture apparatus for:
(i) repeatedly interrogating all said detector elements as a group while said mechanism rotates said circularly variable filter, thereby acquiring a plurality of acquired images of the scene, each said acquired image including a plurality of image portions, with each said image portion being acquired in a different respective spectral band of said circularly variable filter, each said spectral band corresponding to a different illuminator instantaneous wavelength, and
(ii) assembling said image portions to form a plurality of processed images of the scene with each processed image depicting the scene in a single said respective spectral band of said circularly variable filter corresponding to said different illuminator instantaneous wavelength.

* * * * *

UNITED STATES PATENT AND TRADEMARK OFFICE
CERTIFICATE OF CORRECTION

PATENT NO. : 9,291,506 B2
APPLICATION NO. : 13/170188
DATED : March 22, 2016
INVENTOR(S) : Dario Cabib et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 437 days.

Signed and Sealed this
Fifth Day of July, 2016

Michelle K. Lee
*Director of the United States Patent and Trademark Office*